Jan. 2, 1940.    A. R. PACKARD    2,185,419
BATTERY POST CLAMP
Filed July 15, 1939
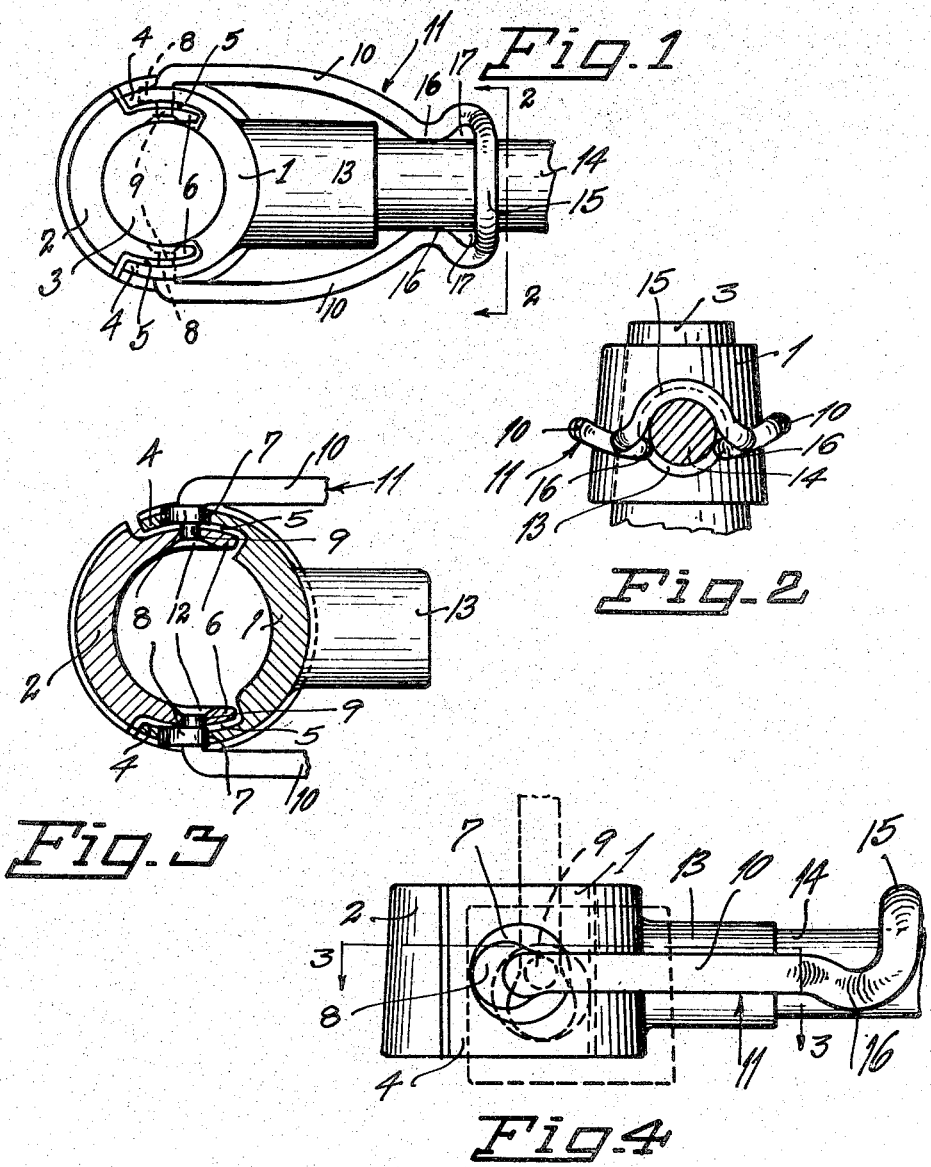
INVENTOR.
Allan R. Packard
BY
ATTORNEY.

Patented Jan. 2, 1940

2,185,419

UNITED STATES PATENT OFFICE 2,185,419

BATTERY POST CLAMP

Allan R. Packard, Spirit Lake, Idaho

Application July 15, 1939, Serial No. 284,731

6 Claims. (Cl. 173—259)

This invention relates to a battery post clamp and it is one object of the invention to provide a device of this character which is carried by a power cable and serves as means for firmly connecting the cable with a battery post without likelihood of corrosion occurring.

Another object of the invention is to provide a clamp of this character which consists of a sleeve adapted to fit about the battery post and consisting of companion sections having means associated therewith for contracting the sleeve and holding the sections thereof in tight binding engagement with the post.

Another object of the invention is to provide a clamp wherein one section of the sleeve carries a yoke having cams and constituting means for turning the cams and causing the sections to be drawn tightly about a battery post.

Another object of the invention is to so form the yoke that a portion thereof constitutes jaws for tightly gripping a cable and firmly holding the yoke in position to maintain the sleeve sections in gripping engagement with a battery post.

Another object of the invention is to so form the yoke that while it may be manually moved to a secured position, in which position its jaws grip the cable, the jaws will be so tightly engaged with the cable that a prying instrument will be required to move the yoke to a releasing position when it is desired to detach the sleeve from a battery post.

Another object of the invention is to so form the yoke that when it is in a secured position it will extend longitudinally of a cable and a cable receiving socket in close proximity thereto, the sections of the post engaging sleeve being so formed that the sleeve will be of an even external diameter.

The invention is illustrated in the accompanying drawing, wherein:

Figure 1 is a top plan view of the improved clamp.

Figure 2 is a view taken on the line 2—2 of Figure 1, the cable being shown in cross section and the clamp and battery post in elevation.

Figure 3 is a view taken on the line 3—3 of Figure 4.

Figure 4 is a side elevation of the clamp.

This improved battery clamp consists of a sleeve formed of companion sections 1 and 2 which are tapered upwardly so that the sleeve may fit closely about a tapered battery post 3. The inner or rear section 1 is internally reduced in thickness to form arms or tongues 4 and internal recesses 5, and the front or outer section 2 is externally reduced in thickness to form arms or tongues 6 for fitting within the recesses 5 of the section 1. Large openings 7 are formed through the tongues 4 and in these openings operate cams 8 carried by the inturned fingers 9 of the arms 10 of a yoke 11. Ends of the fingers are rotatably mounted through openings formed in the tongues 6 of the section 2 and their extremities are upset to form rivet heads 12 serving to maintain the fingers in connection with the tongues 6. Therefore, the yoke or lever 11 will be pivotally carried by the tongues 6 of the section 2, and from an inspection of Figure 4, it will be readily seen that when the lever or yoke is moved, the cams will be moved to contract or expand the sleeve, according to the direction in which the yoke is moved. The fact that the tongues overlap and the tongues 6 fit into the seats or recesses 5, causes the inner and outer surfaces of the two sections 1 and 2 to be flush with each other. Therefore, the sleeve will be of even external diameter throughout its circumference and also of an internal diameter and when the clamp is applied to a battery post and the sleeve contracted, it will have close fitting gripping engagement with the post and corrosion will not develop. The section 1 carries a neck or socket 13 in which the conductor cable 14 is soldered or otherwise secured, and upon referring to Figures 1 and 4, it will be seen that the yoke 11 is of such length that when it is swung downwardly into position to contract the sleeve, it extends beyond the outer end of the neck 13. The bridge 15 of the yoke or lever is curved, as shown in Figure 2, so that when the yoke is in lowered position, the bridge conforms substantially to the curvature of the cable and has snug fitting engagement therewith. Ends of the bridge project laterally from opposite sides of the cable and adjoining portions of the arms 10 are crimped inwardly to form jaws 16 which are disposed at a downward incline and tightly grip the cable from opposite sides below the center of the cable. It will thus be seen that the resilient jaws will have such gripping engagement with the cable that the yoke or lever will be prevented from accidentally slipping out of engagement therewith. As the rear ends of the jaws extend away from the cable, spaces 17 are provided through which a prying tool, such as a screw driver or the like, may be engaged, for prying the lever out of gripping engagement with the cable. When the lever is swung upwardly the cams 8 shift the sections 1 and 2 of the sleeve away from each other and the clamp will be released from the battery post. Therefore, the sleeve may be expanded or contracted by means of the lever but when it is contracted into tight gripping engagement with the post, it will be firmly held in close fitting gripping engagement therewith and prevented from working loose.

Having thus described the invention, what is claimed is:

1. A battery post clamp comprising a sleeve having companion sections, one section being internally reduced to form tongues and internal seats, the other section being reduced externally to form tongues received in said seats and overlapped by the tongues of the first sections, the tongues of the first section being formed with openings, a neck extending from one section for receiving a conductor cable, a resilient yoke having a bridge and arms extending therefrom, and portions of said arms being bent inwardly to form fingers passing through the openings of the arms of the first section and rotatably secured through arms of the second section to pivotally mount the yoke, cam disks carried by said fingers eccentric thereto and operating in the openings of the arms of the first section for engaging walls of said openings and shifting the sections relative to each other to expand and contract the sleeve according to the direction in which the yoke is moved, said yoke being of greater length than said neck and having its bridge curved to fit snugly about a cable and its arms bent inwardly adjacent the bridge to form jaws extending inwardly at a downward incline for gripping the cable from opposite sides thereof below the center of the cable.

2. A battery post clamp comprising a sleeve consisting of companion sections having tongues at their sides, the tongues of one section overlapping the tongues of the other section, the outer tongues being formed with large openings, a yoke having a bridge and arms extending therefrom, said yoke consisting of a lever having ends of its arms bent to form inwardly directed fingers passing through the openings of the outer tongues and rotatably engaged with the inner tongues to pivotally mount said lever, cam disks eccentrically carried by said fingers and operating in said openings to engage the walls thereof and shift the sections toward and away from each other according to the direction in which the lever is moved, the bridge of said lever being curved longitudinally and the arms being crimped inwardly adjacent the bridge to form gripping jaws extending inwardly at a downward incline for gripping a cable from opposite sides thereof below the center of the cable and firmly holding the lever in a depressed position with the sleeve contracted for gripping a battery post.

3. A battery post clamp comprising a sleeve consisting of companion sections, one section having its side portions overlapping side portions of the other section and formed with openings, a resilient lever having arms formed with inwardly extending fingers passing through the openings of the first mentioned section and rotatably engaged with overlapped portions of the second section to pivotally mount said lever for swinging movement from a raised position to a lowered position, cams carried by said fingers and operating in said openings for shifting the sleeve sections toward each other and constricting the sleeve about a battery post when the lever is swung to its lowered position, and the arms of said lever being bent inwardly to form jaws extending inwardly at a downward incline for gripping a cable from opposite sides below the center of the cable.

4. A battery post clamp comprising a sleeve consisting of companion sections, one section having its side portions overlapping side portions of the other section and formed with openings, a resilient lever having arms formed with inwardly extending fingers passing through the openings of the first mentioned section and rotatably engaged with overlapped portions of the second section to pivotally mount said lever for swinging movement from a raised position to a lowered position, cams carried by said fingers and operating in said openings for shifting the sleeve sections toward each other and constricting the sleeve about a battery post when the lever is swung to its lowered position, and jaws extending inwardly from the arms of the lever at a downward incline near the free end of the lever for gripping a cable from opposite sides below the center of the cable.

5. A battery post clamp comprising a sleeve consisting of companion sections, one section having its side portions overlapping side portions of the other section and formed with openings, a resilient lever having a bridge for straddling a cable carrying one section of said sleeve and arms extending from the bridge, pins extending from said arms through the openings of the first mentioned sleeve section and pivotally connecting said lever with the overlapped sleeve section, cams carried by said fingers and operating in said openings, and jaws carried by the arms of said lever.

6. A battery post clamp comprising a sleeve consisting of companion sections, one section having its side portions overlapping side portions of the other section and formed with openings, a lever having spaced arms provided with inwardly extending fingers passing through the openings and pivotally connecting the lever with the overlapped side portions of the second mentioned sleeve section, and cams carried by said fingers and operating in the openings for shifting the sleeve sections toward and away from each other according to the direction in which the lever is moved.

ALLAN R. PACKARD.